United States Patent [19]

Simpson et al.

[11] Patent Number: 5,700,216
[45] Date of Patent: Dec. 23, 1997

[54] HYDRAULIC TENSIONER FOR DUAL CHAIN SYSTEM

[75] Inventors: Roger T. Simpson, Ithaca; Philip J. Mott, Dryden, both of N.Y.

[73] Assignee: Borg-Warner Automotive, Inc., Sterling Heights, Mich.

[21] Appl. No.: 760,834

[22] Filed: Dec. 5, 1996

[51] Int. Cl.$^6$ ............................................. F16H 7/08
[52] U.S. Cl. ........................... 474/110; 474/110; 474/138
[58] Field of Search ........................... 474/110, 111, 474/134–138

[56] References Cited

U.S. PATENT DOCUMENTS

| | | |
|---|---|---|
| 4,457,741 | 7/1984 | Hoeptner .............................. 474/138 |
| 4,539,001 | 9/1985 | Okabe .................................. 474/138 |
| 5,021,032 | 6/1991 | Macchiarulo et al. ................ 474/138 |
| 5,259,820 | 11/1993 | Mott .................................... 474/110 |
| 5,277,664 | 1/1994 | Mott .................................... 474/110 |
| 5,462,493 | 10/1995 | Simpson .............................. 474/111 |

Primary Examiner—Roger J. Schoeppel
Attorney, Agent, or Firm—Sidley & Austin; Greg Dziegielewski

[57] ABSTRACT

A hydraulic tensioner for operation of a dual chain system including at least one piston maintaining force on two chain guide arms. One embodiment includes an inner and outer piston with a first spring within the bore and a second spring on top of the housing, where each piston contacts a chain guide arm. A second embodiment includes one piston with a fulcrum arm contacting the chain guide arms. A third embodiment includes two pistons arranged side-by-side sharing the same chamber and check valve assembly.

5 Claims, 2 Drawing Sheets

FIG. IA

HYDRAULIC TENSIONER FOR DUAL CHAIN SYSTEM

BACKGROUND OF THE INVENTION

The present invention is directed to a hydraulic tensioner having a pair of tensioner arms that maintain the tensioning force on two chains. The arms are positioned at the top of one or two pistons, which are designed so that each arm is maintained at the same tension.

Hydraulic tensioners are typically used as a control device for a chain drive system in an automobile timing system. Generally, it is important to impart and maintain a certain degree of tension to the chain to prevent noises or slippage. Prevention of slippage is especially important in the case of a chain driven camshaft in an internal combustion engine because slippage may alter the camshaft timing by several degrees, possibly causing damage. The tension in the chain may vary greatly due to the wide variation in the temperature and the linear thermal expansion among the various parts of the engine. Camshaft and crankshaft induced torsional vibrations cause chain tension to vary considerably. This tension variation results in chain elongation. Moreover, wear to the chain components during prolonged use can produce a decrease in the tension of the chain.

A hydraulic tensioner is used to take up the slack in the chain or belt that connects the camshafts to the crankshaft of the engine timing system. A typical hydraulic tensioner is comprised of a housing having a bore, a fluid chamber defined by the bore, and a hollow piston biased in a protruding direction from the bore by a spring. A check valve is also included in the hydraulic tensioner to permit fluid flow from a source of pressurized fluid into the fluid chamber, while preventing back flow in the reverse direction. The force of the chain against the piston in an inward direction is balanced by the resistance force of the fluid and force of the spring in an outward direction.

A camshaft to crankshaft connection of a modern engine may require two separate chains. Similarly, in a phased chain system, as shown in U.S. Pat. No. 5,462,493, which is incorporated herein by reference, two parallel chains are placed in a side-by-side relationship, but offset by one-half pitch or one-half sprocket tooth distance. With a typical hydraulic tensioner, each chain could wear at different rates and cause one of the chains to be tighter than the other. A timing drive system of two chains, two arms, and two tensioners is costly. Therefore, to control wear and cost, a single hydraulic tensioner maintaining force on both chains is desirable.

The present invention provides a hydraulic tensioner that addresses the problems of wear to the chains, noise and slippage, and undesirable costs. By providing two contact elements on one tensioner to control two chains, a constant tension is kept on both chains. The chains may wear at different rates, but the overall tension will be maintained. Additionally, the cost of a single tensioner is less than a tensioning system with two tensioners.

SUMMARY OF THE INVENTION

The present invention is directed to a hydraulic tensioner having a pair of tensioner arms that maintain the tensioning force on two chains. The arms are positioned at the top of one or two pistons. The pistons are designed so that each arm is maintained at the same tension. Thus, as the chains wear at different rates, the tension on each chain is maintained.

In a first embodiment, the hydraulic tensioner includes a housing having a bore defining a fluid chamber and inner and outer hollow pistons slidably received within the bore. The inner piston contacts a first tensioner arm and the outer piston contacts a second tensioner arm. The pistons are constructed to be exposed to the same area of the high pressure chamber of the tensioner. A first spring is located within the bore and biases the inner piston in a protruding direction from the bore. A second spring is located at the top of the housing, concentric with but outside of both pistons, and biases the outer piston in a protruding direction from the bore. Each piston is acted upon by the same volume of fluid in the bore. In addition, a seal ring is located between the outer piston and the bore, and between the inner and outer pistons, within a groove in each piston. The seal ring controls leakage from the fluid chamber.

A check valve is also provided between the chamber and a source of pressurized fluid to permit fluid flow from an oil supply inlet into the chamber while blocking flow in the reverse direction. A passage in the housing connects the chamber with the source of pressurized fluid. Fluid is supplied by a reservoir and flows through the check valve into the pressurized chamber.

In a second embodiment of the present invention, the tensioner includes a single piston with a fulcrum arm. The two tensioner arms are provided at each side of the fulcrum arm. The fulcrum arm swivels to maintain contact with each chain guide to maintain a balanced force on both chains.

In a third embodiment of the present invention, the tensioner includes two D-shaped pistons in side-by-side relationship in the bore. Each piston is exposed to an equal area of the high pressure chamber. Thus, the force reacting from each chain would be the same. A seal ring is mounted in the bore outside of both pistons.

To produce a pressure differential, a compression spring is commonly used to provide a bias force on the tensioner piston. In the first and third embodiments, two compression springs bias each of two pistons. This produces a lower pressure in the fluid chamber as each piston is urged away from the check valve and permits flow through the valve into the chamber. As the chain slackens and tightens, the piston protrudes or resists inward movement in response to the vibration of the chain. The outward force of the spring and fluid on the piston balances the inward force of each chain on each piston.

BRIEF DESCRIPTION OF THE DRAWINGS

FIG. 1A is a cross-sectional bottom view of the pistons of the tensioner of FIG. 1.

DETAILED DESCRIPTION OF THE PREFERRED EMBODIMENTS

Figure 1:
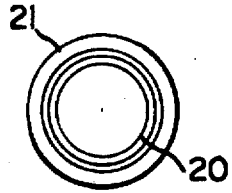
FIG. 1 is a cross-sectional view of a first embodiment of the present invention.
Figure 1:
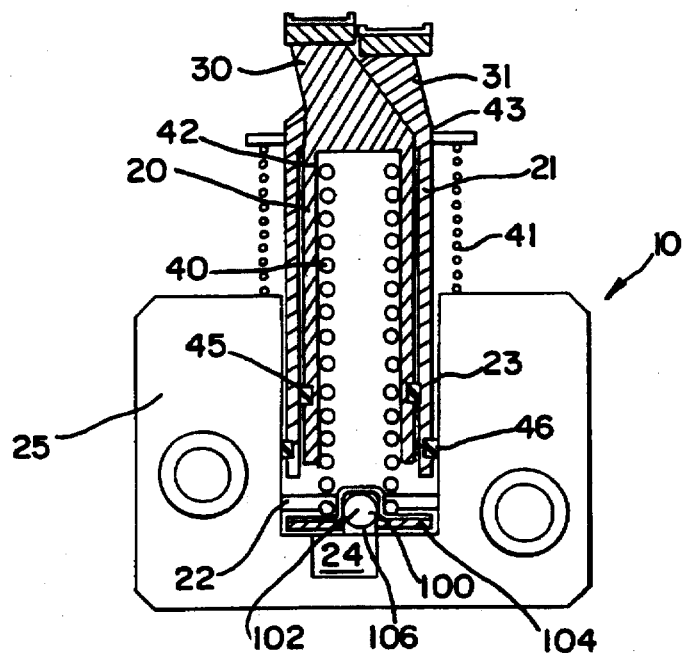
Figure 4:
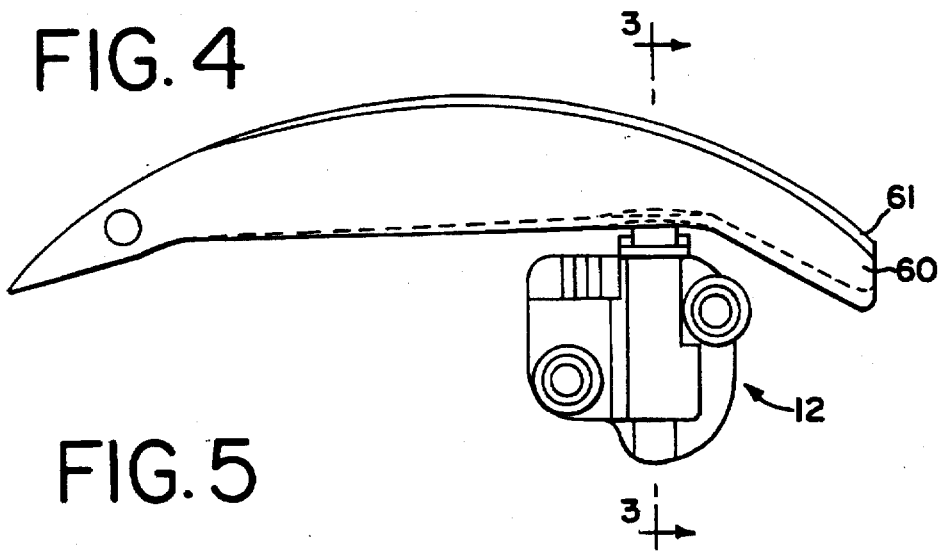
FIG. 4 is a side view of the tensioner and chain guide arm assembly of FIG. 3.

FIG. 1 illustrates a first embodiment of hydraulic tensioner 10 incorporating two pistons for a dual chain system. The tensioner 10 includes a housing 25 having a bore 23 in its center, which is filled with fluid through a passageway 24 from a pressurized fluid source (not shown). The fluid source may be an oil pump or a reservoir. The housing 25 receives an inner piston 20 and an outer piston 21, each having an upper end, 30 and 31, respectively, in the bore 23. The pistons 20 and 21 form a fluid chamber 22 with the bore 23, where each piston is exposed to the same area at the top of the chamber 22. The upper end 30 contacts a first chain guide arm 60, as shown in FIG. 4, to provide tension along a first chain strand, and the upper end 31 contacts a second chain guide arm 61, as shown in FIG. 4, to provide tension along a second chain strand.

A first spring 40 contacts the inside 42 of the upper end of the inner piston 20 to bias the piston 20 in a protruding or outward direction. A second spring 41 contacts the outside 43 of the upper end of the outer piston 21 to bias the piston 21 in a protruding or outward direction. Each piston, 20 and 21, has a groove that holds a seal ring, 45 and 46, respectively. The seal rings 45 and 46 ensure proper controlled leakage of the high pressure chamber 22.

A check valve 100 is provided between the chamber 22 and the passageway 24 as the source of fluid pressure to permit fluid flow into the chamber 22, while blocking fluid flow in the reverse direction. During operation, the force of a chain against a piston is balanced by the force of a spring and the pressurized fluid in the chamber 22. The check valve 100 includes a ball 102 and spring 104 biasing the ball toward a ball seat 106. The check valve 100 may be a variable orifice check valve as shown and described in U.S. Pat. No. 5,259,820 and U.S. Pat. No. 5,277,664, both of which are owned by the assignee of the present application and both of which are incorporated herein by reference.

During start-up, high pressure fluid enters through passageway 24 and opens the check valve 100 such that fluid flows into chamber 22. As fluid fills the chamber 22, the pistons 20 and 21 move outward by the force of the pressurized fluid and the springs 40 and 41, respectively. The pistons 20 and 21 continue to move outward until the inward force of the chains on the pistons 20 and 21 balance the outward force of the springs 40 and 41. At this point, the check valve 100 closes and prevents further fluid flow.

When a chain slackens due to wear or load fluctuations, the piston moves outward again and the check valve reopens to allow more fluid into the chamber 22. The two pistons 20 and 21 move independently in conjunction with the force of the fluid and the two springs 40 and 41. Piston 20 responds to one chain, while piston 21 responds to the second chain. The two pistons 20 and 21 permit adjustment of the tensioning force on each chain with only a single tensioner body and bore. A lower force from one of the two chains on one piston will cause the entire system to adjust in order to maintain tension. To prevent leakage of fluid, the seal rings 45 and 46 control the amount of fluid that can escape from the chamber 22.

Figure 2:
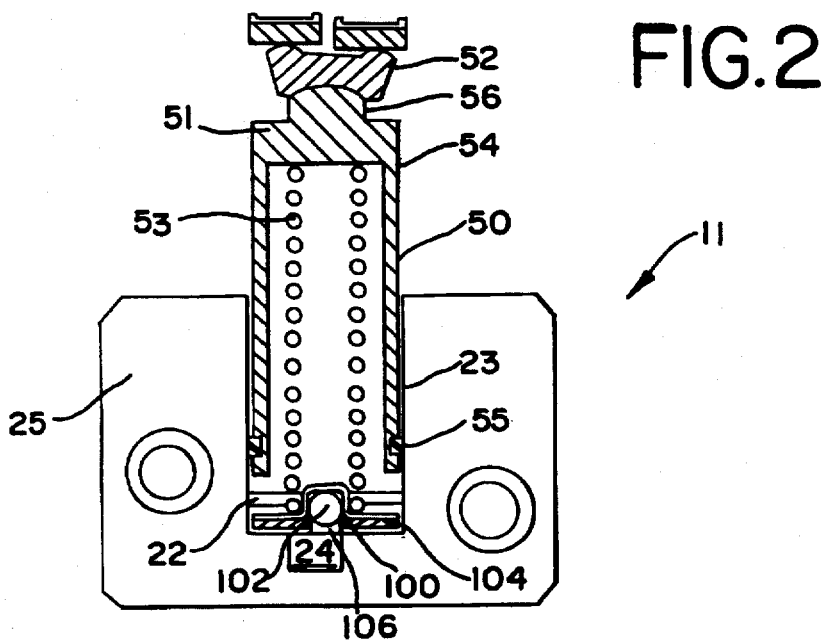
FIG. 2 is a cross-sectional view of a second embodiment of the present invention.

In FIG. 2, the second embodiment of the present invention is shown. Tensioner 11 includes a single piston 50 having an upper end 51. A fulcrum arm 52 is located on the upper end 51 of the piston 50 and contacts chain guide arms to provide tension along two chain strands.

A spring 53 contacts the inside 54 of the upper end 51 of the inner piston 50 to bias the piston 50 in a protruding or outward direction. The piston 50 also includes a seal ring 55 to control the leakage of the chamber 22. The embodiment of FIG. 2 provides a single piston and bore, but balances the load by movement of the fulcrum arm 52 over a fulcrum 56. As the force from each chain differs, the fulcrum arm 52 adjusts its position.

Figure 3:
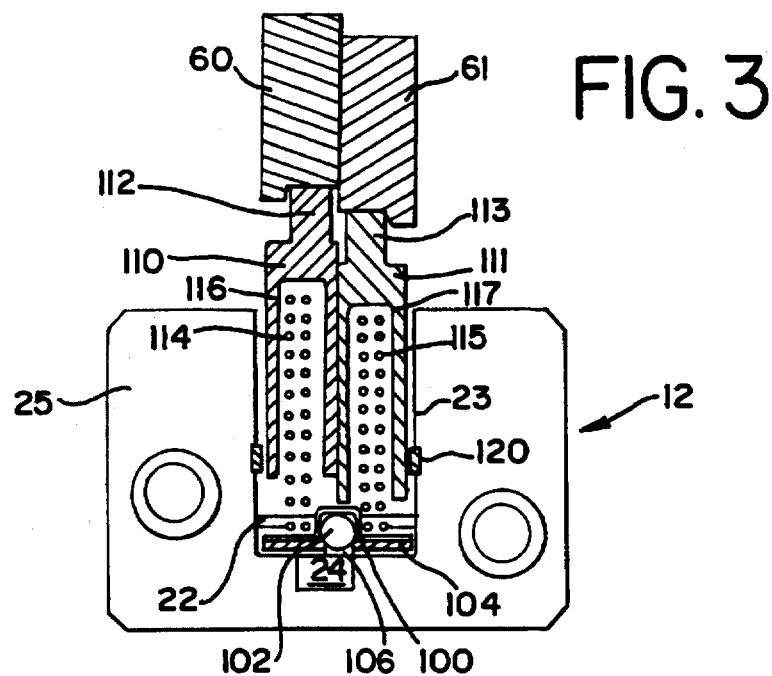
FIG. 3 is a cross-sectional view of a third embodiment of the present invention.
Figure 5:
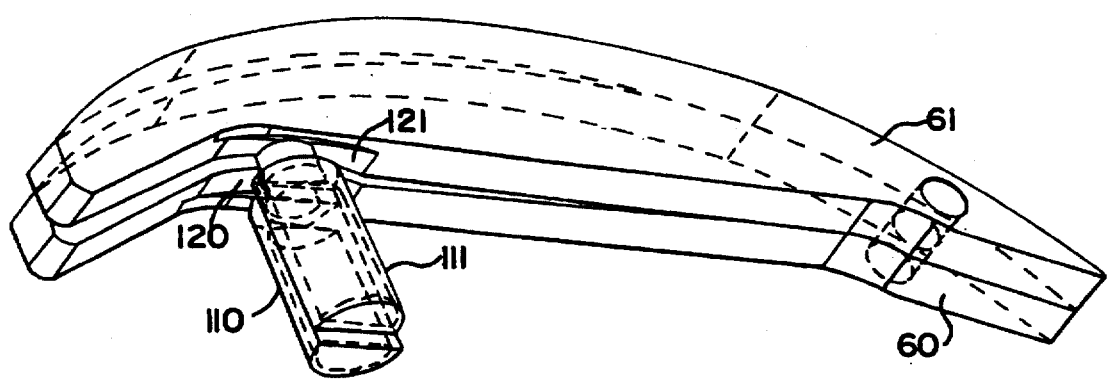
FIG. 5 is a perspective view of chain guide arms and their piston mating slots of the tensioner of FIG. 3.

A third embodiment of the dual chain system tensioner is shown in FIGS. 3, 4 and 5. The tensioner 12 includes two D-shaped pistons, 110 and 111, having upper ends 112 and 113, respectively. The bottom area of each piston exposed to the fluid force in the chamber 22 is equal so that the force reacting from each chain is the same. The two pistons 110 and 111 are generally semicircular, or D-shaped, and face one another in a singular circular bore. In FIG. 3, a first contact piece is located on top of the upper end 112 of the piston 110 and contacts a first chain guide arm 60 to provide tension along a first chain strand. Similarly, a second contact piece is located on top of the upper end 113 of the piston 111 and contacts a second chain guide arm 61 to provide tension along a second chain strand.

A first spring 114 contacts the inside 116 of the upper end 112 of the first piston 110 to bias the piston 110 in a protruding or outward direction. A second spring 115 contacts the inside 117 of the upper end 113 of the second piston 111 to bias the piston 111 in a protruding or outward direction. The seal ring 120, in this embodiment, is mounted within the bore. The seal ring 120 ensures proper controlled leakage of the high pressure chamber 22.

FIG. 4 illustrates tensioner 12 in contact with chain guide arms 60 and 61. FIG. 5 displays the first and second contact pieces of the pistons 110 and 111 fit into mating slots 120 and 121, respectively, at the bottom of chain guide arms 60 and 61. The upper end of each piston in the first and third embodiments, or fulcrum arm 52 in the second embodiment, fits into these mating slots 120 and 121 to prevent rotation of the pistons when the tensioner is mounted in a vehicle.

Those skilled in the art to which the invention pertains may make modifications and other embodiments employing the principles of this invention without departing from its spirit or essential characteristics, particularly upon considering the foregoing teachings. The described embodiments are to be considered in all respects only as illustrative and not restrictive and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. A hydraulic tensioner comprising:
 a housing having a bore, said bore defining a fluid chamber;
 inner and outer hollow pistons slidably received within one another within the bore, said inner piston pushing on a first tensioner arm and said outer piston pushing on a second tensioner arm;
 a first spring located within the bore, said first spring biasing the inner piston in a protruding direction from said bore;
 a second spring located at the top of the housing circumferentially outside of said inner and outer pistons, said second spring biasing the outer piston in a protruding direction from said bore;
 a check valve provided between the chamber and a source of pressurized fluid to permit fluid flow from an oil supply inlet into the chamber while blocking flow in the reverse direction; and
 a passage in the housing to connect the chamber with the source of pressurized fluid, the flow of fluid into said chamber causing outward movement of said inner piston and said outer piston from said bore.

2. The hydraulic tensioner of claim 1 wherein each piston includes a seal ring provided in a groove.

3. A hydraulic tensioner comprising:

a housing having a bore, said bore defining a fluid chamber;

a piston slidably received within the bore;

a spring located within the bore, said spring biasing the piston in a protruding direction from said bore;

a check valve provided between the chamber and a source of pressurized fluid to permit fluid flow from an oil supply inlet into the chamber while blocking flow in the reverse direction;

a passage in the housing to connect the chamber with the source of pressurized fluid; and a fulcrum arm mounted on top of said piston, said fulcrum arm maintaining contact with each of a pair of chain guide arms.

4. A hydraulic tensioner comprising:

a housing having a bore, said bore defining a fluid chamber;

first and second pistons arranged in side-by-side relation, said pistons slidably received within the bore, said first piston contacting a first tensioner arm and said second piston contacting a second tensioner arm;

a first spring located within the bore, said first spring biasing the first piston in a protruding direction from said bore;

a second spring located within the bore, said second spring biasing the second piston in a protruding direction from said bore;

a check valve provided between the chamber and a source of pressurized fluid to permit fluid flow from an oil supply inlet into the chamber while blocking flow in the reverse direction; and a passage in the housing to connect the chamber with the source of pressurized fluid, the flow of fluid into said chamber causing outward movement of said first and second pistons from said bore.

5. The hydraulic tensioner of claim 4 wherein said first and second pistons are D-shaped in cross-section.

* * * * *